United States Patent
Series et al.

(10) Patent No.: US 11,932,423 B2
(45) Date of Patent: Mar. 19, 2024

(54) COMPUTER SYSTEMS FOR ACQUIRING SATELLITE IMAGES WHILE TAKING INTO ACCOUNT METEOROLOGICAL UNCERTAINTY

(71) Applicant: AIRBUS DEFENCE AND SPACE SAS, Toulouse (FR)

(72) Inventors: Benoît Series, Toulouse (FR); Mathieu Picard, Toulouse (FR); Jonathan Guerra, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 368 days.

(21) Appl. No.: 17/429,270

(22) PCT Filed: Feb. 7, 2020

(86) PCT No.: PCT/FR2020/050215
§ 371 (c)(1),
(2) Date: Aug. 6, 2021

(87) PCT Pub. No.: WO2020/161446
PCT Pub. Date: Aug. 13, 2020

(65) Prior Publication Data
US 2022/0250771 A1   Aug. 11, 2022

(30) Foreign Application Priority Data
Feb. 8, 2019 (FR) ...................... 19 01294

(51) Int. Cl.
*B64G 1/10* (2006.01)
*G01W 1/10* (2006.01)
(Continued)

(52) U.S. Cl.
CPC ............. *B64G 1/1021* (2013.01); *G01W 1/10* (2013.01); *G05D 1/0094* (2013.01);
(Continued)

(58) Field of Classification Search
CPC ...... B64G 1/1021; B64G 1/1028; G01W 1/10; G05D 1/0094; G06F 18/2321; G06V 20/13; G06Q 10/04; G06Q 10/06; G06T 1/0007
See application file for complete search history.

(56) References Cited

U.S. PATENT DOCUMENTS

| | | | |
|---|---|---|---|
| 10,392,133 B2 * | 8/2019 | Blanc-Pâques | G06Q 10/06 |
| 2012/0029812 A1 * | 2/2012 | Altwaijry | G06Q 10/04 |
| | | | 701/531 |
| 2020/0160029 A1 | 5/2020 | Amselem et al. | |

FOREIGN PATENT DOCUMENTS

| | | |
|---|---|---|
| CN | 106 845 692 | 6/2017 |
| CN | 108 256 822 | 7/2018 |

(Continued)

OTHER PUBLICATIONS

French Search Report of French Application No. 1901294 dated Nov. 4, 2019, 2 pages.

(Continued)

Primary Examiner — Brian P Sweeney
(74) Attorney, Agent, or Firm — Nixon & Vanderhye P.C.

(57) ABSTRACT

Computer systems (100) for satellite image acquisition and mission-plan calculation devices (120) for satellite and also Earth observation satellites (110). Based on the observation that the uncertainty connected with meteorological conditions can lead to the development of mission plans, for satellites, with low effectiveness, the uncertainty is characterized and used to improve the preparation of mission plans for satellite. A model of the uncertainties is built upon observations and/or past meteorological forecasts. Next, at the time of planning, the model is used by presenting the observations and/or the current forecast as input to the (Continued)

model. In that way, the acquisition zones for which it is unlikely to get acceptable images on the preferred acquisition date may be identified.

12 Claims, 2 Drawing Sheets

(51) Int. Cl.
 *G05D 1/00* (2006.01)
 *G06F 18/2321* (2023.01)
 *G06K 9/62* (2022.01)
 *G06V 20/13* (2022.01)
(52) U.S. Cl.
 CPC .......... *G06F 18/2321* (2023.01); *G06V 20/13* (2022.01); *B64G 1/1028* (2023.08)

(56) References Cited

FOREIGN PATENT DOCUMENTS

FR 3 039 728 2/2017
WO 2019/020499 1/2019

OTHER PUBLICATIONS

International Search Report and its English Translation for PCT/FR2020/050215 dated May 18, 2020, 6 pages.
Written Opinion of the ISA for PCT/FR2020/050215 dated May 18, 2020, 8 pages.

\* cited by examiner

COMPUTER SYSTEMS FOR ACQUIRING SATELLITE IMAGES WHILE TAKING INTO ACCOUNT METEOROLOGICAL UNCERTAINTY

RELATED APPLICATION

This application is the U.S. national phase of International Application PCT/FR2020/050215 filed Feb. 7, 2020, which designated the U.S. and claims priority to French Patent Application 19 01294 filed Feb. 8, 2019, the entire contents of each of which are hereby incorporated by reference.

FIELD OF INVENTION

The invention relates to the field of remote sensing by satellite. More specifically, it relates to computer systems for satellite image acquisition. It also relates to mission-plan calculation devices for satellite and also Earth observation satellites.

BACKGROUND OF INVENTION

The circumterrestrial space contains many Earth observation satellites which serve in particular to monitor parameters of the Earth system (oceans, atmosphere, natural resources, impacts of human activities, etc.), to get maps or to provide information which serves to provide for the defense of States. To do that, these systems are based on a collection of satellite imaging data, meaning a set of measurements made by onboard instruments on the satellites.

Because observation of the Earth is becoming commonplace, demands on satellite imaging are multiplying from day-to-day. However, some resources of the satellites are limited, like the number of images that can be taken during overflight of an area of the globe or again the capacity for transmission of data to the ground. The use of these resources must therefore be planned while also responding to requests for satellite imagery.

In the field of optical observation of the Earth, satellite imaging depends on meteorological conditions. In fact, clouds present in the acquisition zone may mask the object or territory that is intended to be observed, and considering the meteorological conditions when calculating the mission plan for the satellite is known (see CN 106845692 A, CN 108256822 A, US 2012/029812 A1). However, it is well known that meteorological forecasts have a lot of uncertainties, whatever the modeling of the meteorological phenomena.

In order to reduce the uncertainties, it is known to do what is called an ensemble forecast. Also, instead of simulating a single set of input data with the model, which constitutes a deterministic forecast, several sets of input data deduced from uncertainties that were estimated are calculated. A set of forecasts is then available that are hoped to be representative of the uncertainty in the deterministic forecast.

However, the ensemble forecast requires lots of calculation time.

Such a feature does not meet the requirements for always greater speed and precision required by clients from systems for remote sensing by satellite.

SUMMARY OF INVENTION

The present invention aims to remedy the aforementioned disadvantages.

To do that, a first aspect of the invention relates to a computer system for satellite image acquisition.

Finally, a second aspect of the invention relates to a mission plan calculation device for satellite.

In that way, the invention relates to a computer system for acquisition of satellite images associated with at least one predetermined zone of the Earth previously divided according to a grid of cells. The system comprises:
  at least one Earth observation satellite comprising:
    an optical imaging system for acquiring at least one satellite image on at least one acquisition date;
    a first satellite transmitter-receiver for receiving a command signal; and
    a first processor for commanding the optical imaging system based on the command signal;
  at least one mission plan calculation device for satellite comprising:
    a second satellite transmitter-receiver for transmitting the command signal; and memory for storing, for each cell, a history of meteorological variable values which comprises meteorological observations and/or meteorological forecasts which were observed and/or which were forecast on a certain date preceding the acquisition date;
    a second processor for
    determining, for each cell, based on the history of meteorological variable values, a plurality of groups of values which each comprise, at least:
      a first meteorological variable value associated with a first history date;
      a second meteorological variable value associated with a second history date later or earlier than the first history date, and
      a history time difference between the first history date and the second history date;
    calculating, for all or part of the predetermined zone of the Earth, based on the plurality of groups of values, a conditional probability function which describes the probability of observing a second meteorological variable value included in a predetermined interval on a second date subject to the condition of:
      observing a first meteorological variable value at a first date which is prior to the second date, and/or
      predicting on a first date a third meteorological variable value for a forecast date located around the second date, specifically, on a date which precedes, follows and/or is equal to the second date,
    and under the additional condition of observing a predetermined time difference between both the first date and also the second and/or forecast date,
    selecting a plurality of cells from the grid, intended to be overflown by the satellite on the acquisition date, based on the orbital characteristics of the satellite, thereby obtaining candidate cells,
    obtaining, for each candidate cell, at least one current meteorological observation associated with a planning date which precedes the acquisition date and/or at least one current meteorological forecast associated with a date located around the acquisition date,
    calculating a mission plan for the satellite based on the candidate cells and the conditional probability function, and
    inserting the mission plan into the command signal.

The invention also covers a mission plan calculation device for satellite. The device comprises:
- a first satellite transmitter-receiver for transmitting a command signal which commands an optical imaging system of the Earth observation satellite for acquiring at least one satellite image on at least one acquisition date,
- memory for storing a history of meteorological variable values which comprise meteorological observations associated with at least one predetermined zone of the earth previously divided according to a grid of cells, where the meteorological observations and/or meteorological forecasts which were observed and/or which were forecast on the date preceding the acquisition date;
- a second processor for
  - determining, for each cell, based on the history of meteorological variable values, a plurality of groups of values which each comprise, at least:
    - a first meteorological variable value associated with a first history date;
    - a second meteorological variable value associated with a second history date later or earlier than the first history date, and
    - a history time difference between the first history date and the second history date;
  - calculating, for all or part of the predetermined zone of the Earth, based on the plurality of groups of values, a conditional probability function which describes the probability of observing a second meteorological variable value included in a predetermined interval on a second date subject to the condition of:
    - observing a first meteorological variable value at a first date which is prior to the second date, and/or
    - predicting on a first date a third meteorological variable value for a forecast date located around the second date, specifically, on a date which precedes, follows and/or is equal to the second date,
  - and under the additional condition of observing a predetermined time difference between both the first date and also the second and/or forecast date,
  - selecting a plurality of cells from the grid, intended to be overflown by the satellite on the acquisition date, based on the orbital characteristics of the satellite, thereby obtaining candidate cells,
  - obtaining, for each candidate cell, at least one current meteorological observation associated with a planning date which precedes the acquisition date and/or at least one current meteorological forecast associated with a date located around the acquisition date,
  - calculating a mission plan for the satellite based on the candidate cells and the conditional probability function, and
  - inserting the mission plan into the command signal.

In a first implementation, the plurality of groups of values further comprises of meteorological variable values which are associated with cells neighboring the current cell. In a second implementation, during the calculation of the mission plan for the satellite, the second processor is further configured for:
- selecting all or part of the candidate cells based on the result of the associated conditional probability function and current meteorological observations and/or current meteorological forecasts, thereby obtaining selected cells; and
- calculating the mission plan for the satellite based on the selected cells.

In an example from the second implementation, the selected cells are the ones for which the conditional probability function gives, for the acquisition date, a probability greater than or less than a first predetermined probability.

In a third implementation, the second processor calculates the conditional probability function based on the estimate of a probability density for all or part of the groups of values.

In a third implementation, the second processor calculates the conditional probability function based on an automatic learning model pre-trained from all or part of the groups of values.

SUMMARY OF FIGURES

Other characteristics and advantages the invention will be better understood upon reading the description which is going to follow and with reference to the attached drawings, given for illustration and in no way limiting.

DETAILED DESCRIPTION OF INVENTION

For reasons of clarity, the elements shown are not necessarily shown at the same scale, relative to each other, unless otherwise indicated.

In the context of the description, system for observation of the earth is understood to mean a system comprising satellite constellations such as Landsat, Spot or even Pleiades. Further, it is specified that the invention relates to optical satellite systems for which the acquisition of images of the Earth depends on solar lighting. These systems use passive sensors with which to record solar radiation reflected by the ground, at various wavelengths.

The general principle of the invention is based on the observation that the uncertainty connected with meteorological conditions can lead to the development of mission plans, for satellites, with low effectiveness which cover acquisition zones having a low probability of getting acceptable images on the preferred acquisition date. Thus, the invention proposes characterizing this uncertainty and using it for improving the preparation of mission plans for satellite. In the invention a model of the uncertainties is built upon observations and/or past meteorological forecasts. Because the uncertainties model is built upon observations and/or past meteorological forecasts, it may be built in advance of any satellite imaging request, such that the quantity of calculations required for building this uncertainty model does not impact the calculation of the mission plan. Next, at the time of planning, the uncertainties model is used by presenting the observations and/or the current forecast as input to the model. In that way, the acquisition zones for which it is unlikely to get acceptable images on the preferred acquisition date may be identified. Thus, three main phases are implemented, specifically a phase for collection of the history corresponding to the observations and/or past meteorological forecasts, a phase of calculation of the uncertainties model in the form of the conditional probability function, and a planning phase which uses the uncertainties model. Typically, the uncertainties model calculation phase is done prior to any satellite imaging request.

Figure 1:
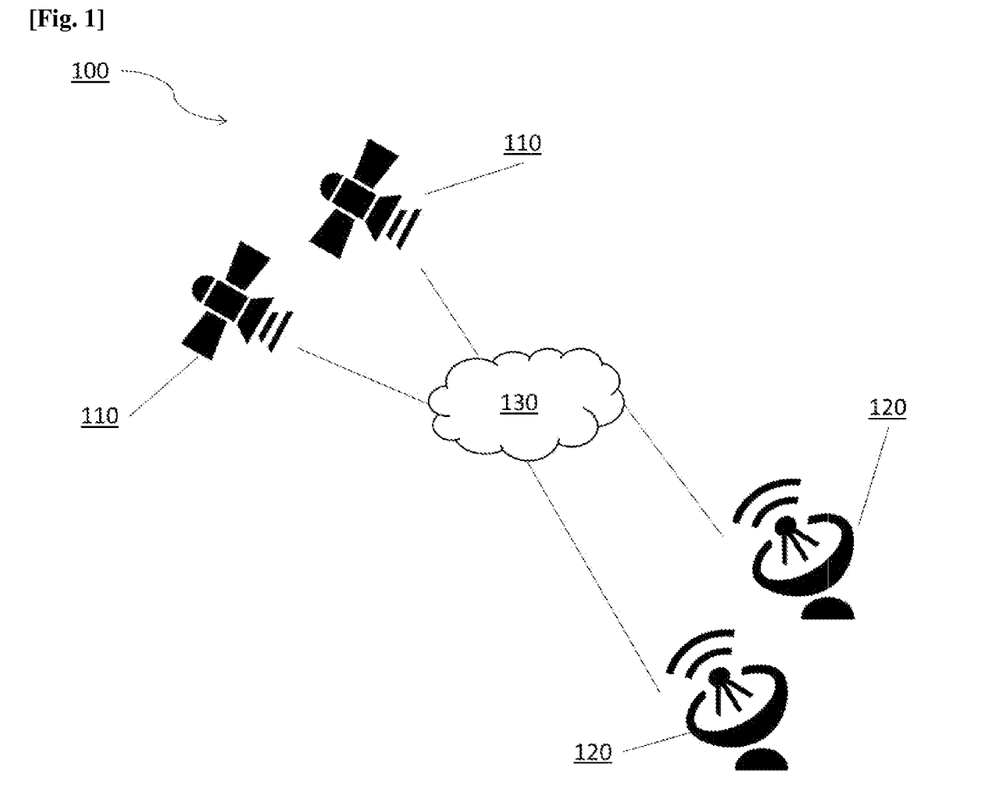
FIG. 1 represents a computer system according to the invention.

FIG. 1 shows according to the invention, a computer system 100 for acquisition of satellite images associated with at least one predetermined zone of the earth.

In the example from FIG. 1, it is assumed that the computer system 100 receives a satellite imaging request similar to the request received and handled by satellite mission centers. However, it is also imagined that the computer system 100 may receive several concurrent requests.

In the invention, the request defines at least one predetermined zone of the Earth in which the satellite imaging acquisition must be done. In an example, the predetermined zone of the Earth is defined by one or more polygons for which the vertices correspond to geographic positions on the terrestrial globe. In a specific implementation, the request is intended to be matched with at least one predetermined Earth observation system which is configured for overflying the predetermined zone of the Earth.

Figure 3:
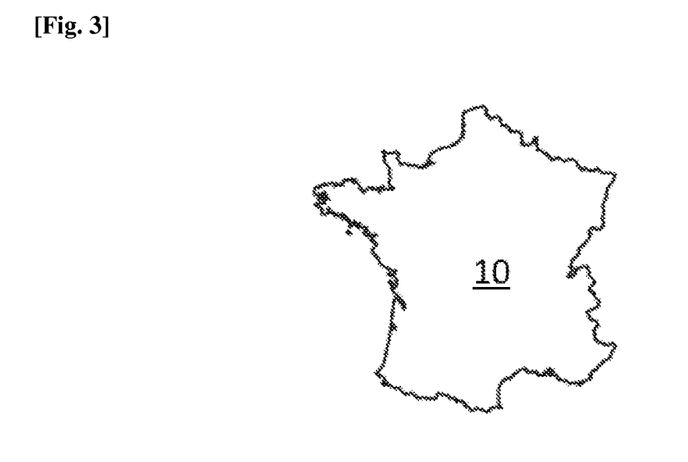
FIG. 3 represents a predetermined zone of the Earth.

FIG. 3 shows an example predetermined zone of the Earth 10.

Figure 4:
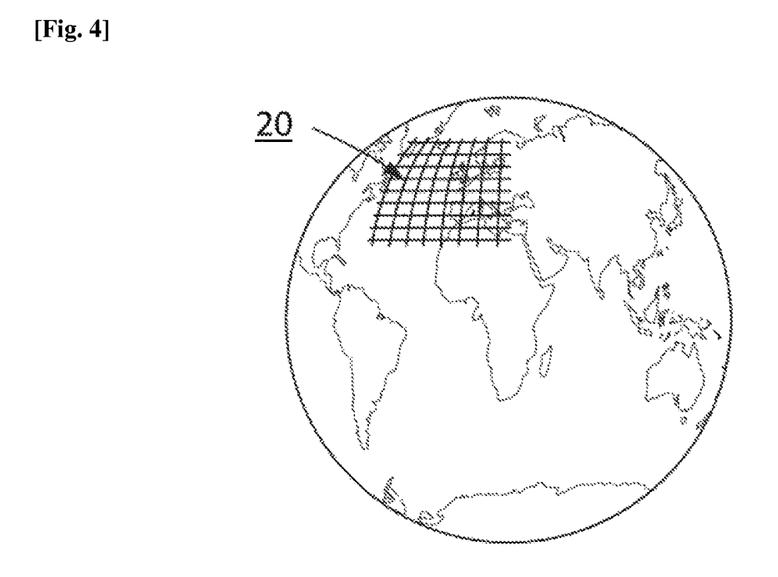
FIG. 4 represents a grid of cells which covers the predetermined zone of the Earth.

In the invention, the predetermined zone of the Earth 10 is divided according to a grid composed of cells. Grid is understood to mean, for example, a horizontal and vertical quadrille. Cell is understood to mean any one of the elementary quadrilaterals which makes up the grid. For example, each cell of the grid has a square shape or a nearly square shape, for example, a rectangular shape. FIG. 4 shows an example grid of cells 20 superposed on the predetermined zone of the Earth 10. In a first example, the grid according to the invention comes in the form of an image file in which each cell associated with a predetermined zone is georeferenced. In a second example, the grid according to the invention comes in the form of a text file in which each line describes at least one cell of the grid with georeferencing information associated with the predetermined zone.

Going back to FIG. 1, the computer system 100 comprises at least one satellite observation of the Earth 110 and at least one mission plan calculation device for satellite 120. Further, the computer system 100 is arranged according to an architecture which is based on a satellite communication network 130 of known type.

Figure 2:
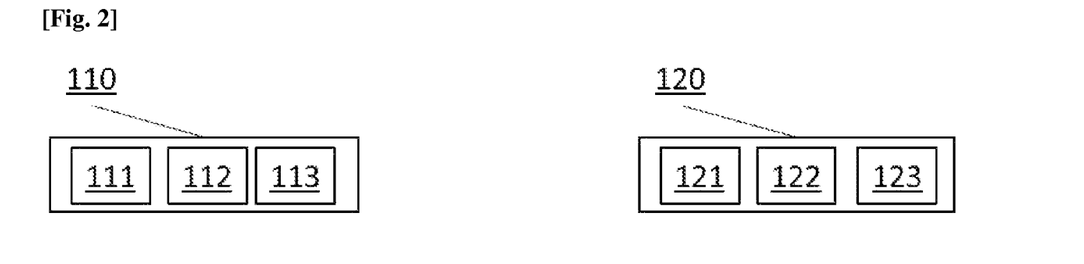
FIG. 2 represents another view of the computer system according to the invention.

In the example from FIG. 2, the satellite for observation of the Earth 110 comprises an optical imaging system 111, a first satellite transmitter-receiver 112 and a first processor 113.

The optical imaging system 111 is intended for acquiring at least one satellite image. In an example, the optical imaging system 111 comprises at least one optical instrument which operates according to a mode of the type selected from: push-broom, push-frame, and step-and-stare.

In the invention, the optical imaging system 111 is intended for acquiring the satellite image on at least one acquisition date. Date is understood to mean the indication of the time, day, month and year.

In one example, it can be considered that the acquisition date is provided by "dd/MM/YYYY HH:mm" where dd corresponds to the day, MM corresponds to the month, YYYY corresponds to the relevant year, HH corresponds to the hour and mm corresponds to the minutes. In another example, it can be considered that the satellite acquisition is done on several days at the following dates "dd/MM/YYYY HH:mm", "(dd+2)/MM/YYYY (HH+1):mm", "(dd+5)/MM/YYYY HH:(mm+15)" and "(dd+6)/MM/YYYY (HH+2):(mm−3)". In the preceding example, the date "(dd+2)/MM/YYYY (HH+1):mm" follows the date "dd/MM/YYYY HH:mm" by 2 days and one hour. The date "(dd+5)/MM/YYYY HH:(mm+15)" follows the date "dd/MM/YYYY HH:mm" by 5 hours less 15 minutes. And the date "(dd+6)/MM/YYYY (HH+2):(mm−3)" follows the date "dd/MM/YYYY HH:mm" by 6 days plus 2 hours less 3 minutes. Other shorter or longer acquisition time intervals can of course be considered according to the needs of the client.

The first satellite transmitter-receiver 112 is intended to receive a command signal. In an example, the command signal is a satellite radio signal which uses a satellite communication protocol of known type.

The first processor 113 is provided for commanding the optical imaging system based on the command signal.

In the example from FIG. 2, the mission plan calculation device for satellite 120 comprises a second satellite transmitter-receiver 121, memory 122 and a second processor 123.

The second satellite transmitter-receiver 121 is intended to transmit the command signal. The memory 122 is intended for storing, for each cell of the grid 20, a history of meteorological variable values which comprises meteorological observations and/or past meteorological forecasts which were observed and/or expected on a date preceding a planning date preceding the acquisition date. In an example, the planning date corresponds to the moment of planning, meaning to a date of starting planning for an acquisition mission. In practice, this date corresponds to the date on which the satellite mission center receives or takes over the satellite imaging request formulated by the clients. In that way, the stored history comprises meteorological observations and/or past meteorological forecasts that were observed even before receiving or taking over the satellite imaging request formulated by the clients.

In the invention, the value stored in the memory 122 is associated with known meteorological variables such as cloud cover, temperature, precipitation level, the properties of the wind, relative humidity or insolation level. In an example, the history of meteorological variable values may be contained in an ERA-Interim data file produced by the ECMWF (European Centre for Medium-Range Weather Forecasts or, in French, Centre Européen pour les Previsions Métérologiques à Moyen Terme). Such a file, according to the invention, may comprise at least one meteorological variable value for each of the cells of the grid 20, and do so, on one or more history dates in one or more years prior to the acquisition date.

The second processor 123 is provided for handling the history of meteorological variable values in order to form the command signal.

To begin with, the second processor 123 is intended for calculating for each cell of the grid 20, based on the history of meteorological variable values, a plurality of groups of values which each comprise, at least:
  a first meteorological variable value associated with a first history date;
  a second meteorological variable value associated with a second history date later or earlier than the first history date, and
  a history time difference between the first history date and the second history date.

Thus, for each cell of the grid 20, the second processor 123 calculates at least one triplet of values. In practice, the second processor 123 identifies at least a first meteorological variable value associated with a first history date. Next, the second processor 123 identifies at least a second meteorological variable value associated with a second history date which is later or earlier than the first history date. Then, the second processor 123 calculates the time difference between the first history date and the second history date. Subsequently, the second processor 123 associates the first and second meteorological values with the time difference within a group of values. Finally, the second processor 123 saves the group of values in the memory 122.

Look at an example in order to illustrate this aspect of the invention. In this example it is assumed that one of the cells of the grid 20 is associated with a history of cloud cover values expressed in percentage of clear sky. Conventionally, cloud cover is understood as the portion of the sky covered in whole or in part by clouds near said cell of the grid 20. As indicated above, cloud cover values can be obtained by observation and/or by forecast. In this example, the cell in question from the grid 20 comprises the following cloud cover values: 100% (date_1), 97% (date_2), 99% (date_3), 80% (date_4), 77% (date_5), 79% (date_6), for which the dates date 1, date 2, date 3, date 4, date 5 and date_6 may be expressed in the same form as those for the acquisition date, as described above. Returning to the example, the second processor 123 may determine the following groups of values by considering date_1 as the first historic date: {100%, 97%, date_2-date_1}, {100%, 99%, date_3-date_1}, {100%, 80%, date_4-date_1}, {100%, 77%, date_5-date_1} and {100%, 79%, date_6-date_1}. When date_3 is considered as the first historic date, the second processor 123 may determine the following groups of values: {99%, 80%, date_4-date_3}, {99%, 77%, date_5-date_3} and {99%, 79%, date_6-date_3}.

However, the second processor 123 is configured for calculating groups of values which comprise more than three values. In this case, the group of values associated with a current cell of the grid 20 may further comprise meteorological variable values which are associated with neighboring cells of the current cell of the grid 20. Neighboring cell is understood to mean a cell of the grid 20 which is located on the same line, the same column and/or around the current cell. As indicated above, the meteorological variable values associated with neighboring cells can be obtained by observation and/or by forecast.

Returning to FIG. 2, the second processor 123 is intended for calculating a conditional probability function specific to all or part of the predetermined zone of the Earth 10 based on the plurality of groups of values. The conditional probability function according to the invention serves to connect meteorological observations and/or meteorological forecasts, observed and/or prepared on different dates, and to do so as a function of the time difference between the observation dates and/or the forecast dates.

In the invention, the conditional probability function describes the probability of observing a second meteorological variable value included in a predetermined interval on a second date subject to the condition of:
 observing a first meteorological variable value at a first date which is prior to the second date, and/or
 predicting on the first date, prior to the second date, a third meteorological variable value for a forecast date located around the second date, specifically, on a date which precedes, follows and/or is equal to the second date.

Further, the second processor 123 calculates the conditional probability function on the additional condition of observing a predetermined time difference between:
 the first date and the second date, and/or
 the first date and the forecast date.

In an example, the conditional probability function according to the invention serves to address questions of the type:

what is the probability of observing a cloud cover value over 82% 3 hours from now in a cell of the grid 20, knowing that I'm now observing a value of 77% there? In this case, the predetermined interval may be included between 82% and 100%.
 what is the probability of observing a cloud cover value over 70% and under 80% 5 hours from now in a cell of the grid 20, knowing that a forecast done 2 hours ago called for a value of 10% there? In this case, the predetermined interval may be included between 70% and 80%.
 what is the probability of observing, cloud cover value over 60% 4 hours from now in a cell of the grid 20, knowing that a forecast done for 4 hours from now predicted a value of 35% there? In this case, the predetermined interval may be included between 60% and 100%.
 what is the probability of observing a cloud cover value under 20% 2 hours from now in a cell of the grid 20, knowing that I'm now observing a value of 30% there and knowing that a forecast done for 2 hours from now predicted a value of 10% there? In this case, the predetermined interval may be included between 0% and 20%.

In a specific implementation, in which the groups of values comprise more than three values, the conditional probability function describes the probability of observing a second meteorological variable value included in a predetermined interval on a second date subject to the supplementary condition of:
 observing at least one fourth meteorological variable value in a neighboring cell of the current cell on a fourth date which is prior to the second date, and/or
 predicting on a fourth date at least one fifth meteorological variable value in a neighboring cell of the current cell for a forecast date located around the second date, specifically, on a date which precedes, follows and/or is equal to the second date.

In an example of this specific implementation, the conditional probability function according to the invention serves to address questions of the type:

what is the probability of observing a cloud cover value over 82% 3 hours from now in a cell of the grid 20, knowing that I'm now observing a value of 77% there and that I'm now observing a value of 52% in a neighboring cell? In this case, the predetermined interval may be included between 82% and 100%.
 what is the probability of observing a cloud cover value over 70% and under 85% 5 hours from now in a cell of the grid 20, knowing that a forecast done 2 hours ago called for a value of 10% there and that a forecast done 2 hours ago called for a value of 10% in a neighboring cell? In this case, the predetermined interval may be included between 70% and 85%.
 what is the probability of observing a cloud cover value under 60% 4 hours from now in a cell of the grid 20, knowing that a forecast done for 4 hours from now predicted a value of 35% there and that a forecast done for 4 hours from now predicted a value of 35% in a neighboring cell? In this case, the predetermined interval may be included between 60% and 100%.
 what is the probability of observing a cloud cover value under 20% 2 hours from now in a cell of the grid 20, knowing that I'm now observing a value of 30% there and knowing that a forecast done for 2 hours from now predicted a value of 10% there and that I'm now observing a value of 27% in a neighboring cell? In this case, the predetermined interval may be included between 0% and 20%.

what is the probability of observing a cloud cover value over 10% under 20% 2 hours from now in a cell of the grid 20, knowing that I'm now observing a value of 30% and that a forecast done for 2 hours from now predicted a value of 10% there and that a forecast done for 2 hours from now predicted a value of 15% in a neighboring cell? In this case, the predetermined interval may be included between 10% and 20%.

In an example implementation, the second processor 123 calculates the conditional probability function based on the estimate of a probability density for all or part of the groups of values. Probability density is understood to mean a function which mathematically weights the spread of the possible values which a parameter could take on. In this example, the second processor 123 estimates the probability density by using known techniques, such as histogram estimation, moving histogram estimation or kernel estimation (for example with the Parzen-Rosenblatt method).

In another example of the invention, the second processor 123 calculates the conditional probability function based on an automatic learning model pre-trained from all or part of the groups of values. In this example, an automatic learning model is trained from a supervised classification algorithm. Thus trained, the pre-trained automatic learning model could predict, for each cell of the grid 20, a class representative of a conditional probability value associated with the second meteorological variable value on the second date as a function of, at least:

the meteorological observation done on the first date and/or the forecast done around the second date, and the time difference between the first date and the second date and/or the time difference between the first date and the forecast date.

In this case, the training phase requires forming a plurality of factors which each comprise a group of values such as described above. Next, for each value group, the conditional probability value is calculated, as described above. In an example, the conditional probability is calculated from a probability density for all or part of the groups of values, as described above. And then, a class indicative of the calculated conditional probability value is defined. Finally, the automatic learning model is trained by presenting, respectively, the vectors and the associated classes to the input and the output of the automatic learning model, so as to get a pre-trained automatic learning model. In a specific implementation, the automatic learning model is built from a multilayer perceptron type artificial neural network or a convolutional type neural network.

Returning to FIG. 2, the second processor 123 selects a plurality of cells from the grid 20 that the satellite 110 is expected to fly over on the acquisition date, based on orbital characteristics of the satellite on the acquisition date, thereby obtaining candidate cells. Orbital characteristics of the satellite is understood to mean the conventional parameters such as altitude, number of revolutions per day or inclination of the orbit. Other parameters of the system may also be defined jointly with the orbital characteristics of a satellite, such as the list of ground stations with which to download the images made by the satellite, the resolution of the imaging system, the spectral band supported by the imaging system of the satellite, the swath of the optical instrument or even the mispointing angle limits allowed for the images.

Then, the second processor 123 gets, for each candidate cell, at least one current meteorological observation associated with the planning date which precedes the acquisition date and/or at least one current meteorological forecast associated with a forecast date located around the acquisition date, specifically, which precedes, follows or is equal to the acquisition date. In the invention, the current meteorological observation and/or the current meteorological forecast is obtained by known methods. "Current" is understood to mean that the corresponding meteorological observation and/or the meteorological forecast was done on a date which is equal to or earlier than the planning date. In practice, it preferably involves the most recent available meteorological observation and/or meteorological forecast available on the planning date.

In a specific implementation, as indicated above, the second processor 123 is also intended to get current observations and/or forecasts, for each neighboring cell of the current candidate cell.

Subsequently, the second processor 123 is intended to calculate a mission plan for the satellite 110 based on the candidate cells and the conditional probability function.

Mission plan is understood to mean the scheduling plan for the satellite considering that it is uploaded/sent to the satellite via the control center and which makes it possible to take the images that the predetermined zone of the Earth 10 according to an order and imaging characteristics provided in the plan. It is known that the mission plan considers kinematic constraints related to the platform and also incorporates the plans for emptying to the various receiving stations. Such a mission plan can be obtained from a mission plan generator of known type, for example is described in the application FR 3,039,728.

Finally, returning to FIG. 2, the second processor 123 is intended to insert the mission plan into the command signal.

In an implementation of the invention, during the calculation of the mission plan for the satellite, the second processor 123 is further intended to select all or part of the candidate cells based on the result of the associated conditional probability function and current meteorological observations and/or current meteorological forecasts, but also based on differences between the acquisition date and the dates on which the current meteorological observations and/or the current meteorological forecasts were done so as to obtain selected grids. Next, the second processor 123 calculates the mission plan for the satellite based on the selected cells.

In this implementation, candidate cells for which it is unlikely to get acceptable images can be set aside from the satellite acquisition.

For example, the selected cells are the ones for which the conditional probability function gives, for the acquisition date, a probability greater than or less than a first predetermined probability.

However, other criteria may further be used for making the selection. For example, priority information for the satellite imaging request or surface information from the candidate cells may be used.

In a specific embodiment of the invention, computer program instructions implement the various operations done by the first and second processors 113, 123. Consequently, the invention also targets a program with a computer program code stored on a nonvolatile storage medium, and which could execute the various operations done by the first and second processors 113, 123 when the computer program is loaded in the computer or executed in the computer.

The invention has been described and illustrated in the present detailed description and in the figures. However, the present invention is not limited to the embodiments presented. Thus, other variants in embodiments can be deduced and implemented by the person skilled in the art upon reading the present description and attached figures.

The invention claimed is:

1. A computer system for acquisition of satellite images associated with at least one predetermined zone of the Earth previously divided according to a grid of cells, the computer system comprising:
at least one Earth observation satellite comprising:
an optical imaging system configured to acquire at least one satellite image on at least one acquisition date;
a first satellite transmitter-receiver configured to receive a command signal; and
a first processor configured to command the optical imaging system based on the command signal;
at least one mission plan calculation device for the at least one Earth observation satellite comprising:
a second satellite transmitter-receiver configured to transmit the command signal; and
a memory configured to store, for each cell, a history of meteorological variable values which comprises meteorological observations and/or meteorological forecasts which were observed and/or which were forecast on a certain date preceding the acquisition date;
a second processor configured for:
determining, for each cell, based on the history of meteorological variable values, a plurality of groups of values which each comprise, at least:
a first meteorological variable value associated with a first history date;
a second meteorological variable value associated with a second history date later or earlier than the first history date, and
a history time difference between the first history date and the second history date;
calculating, for all or part of the predetermined zone of the Earth, based on the plurality of groups of values, a conditional probability function which describes the probability of observing a second meteorological variable value included in a predetermined interval on a second date subject to a condition of:
observing a first meteorological variable value at a first date which is prior to the second date, and/or
predicting on a first date a third meteorological variable value for a forecast date proximate the second date and which precedes, follows and/or is equal to the second date, and
under an additional condition of observing a predetermined time difference between the first date and the second and/or forecast date,
selecting a plurality of cells from the grid, intended to be overflown by the at least one Earth observation satellite on the acquisition date, based on orbital characteristics of the at least one Earth observation satellite, thereby obtaining candidate cells,
obtaining, for each candidate cell, at least one current meteorological observation associated with a planning date which precedes the acquisition date and/or at least one current meteorological forecast associated with a date located around the acquisition date,
calculating a mission plan for the at least one Earth observation satellite based on the candidate cells and the conditional probability function, and
inserting the mission plan into the command signal.

2. The computer system according to claim 1, wherein the plurality of groups of values further comprises of meteorological variable values which are associated with cells neighboring the current cell.

3. The computer system according to claim 1, wherein during the calculation of the mission plan for the at least one Earth observation satellite, the second processor is further configured for:
selecting all or part of the candidate cells based on:
the conditional probability function and based on at least one current meteorological observation and/or based on the at least one current meteorological forecast, and
based on a difference between the acquisition date and a date on which the at least one current meteorological observation and/or the at least one current meteorological forecast was performed,
thereby obtaining selected cells; and
calculating the mission plan for the at least one Earth observation satellite based on the selected cells.

4. The computer system according to claim 3, wherein the selected cells are the ones for which the conditional probability function gives, for the acquisition date, a probability greater than or less than a first predetermined probability.

5. The computer system according to claim 1, wherein the second processor calculates the conditional probability function based on the estimate of a probability density for all or part of the groups of values.

6. The computer system according to claim 1, wherein the second processor calculates the conditional probability function based on an automatic learning model pre-trained from all or part of the groups of values.

7. A mission plan calculation device for an Earth observation satellite comprising:
a first satellite transmitter-receiver configured to transmit a command signal which commands an optical imaging system of the Earth observation satellite for acquiring at least one satellite image on at least one acquisition date,
memory configured to store a history of meteorological variable values which comprise meteorological observations and/or metrological forecasts associated with a predetermined zone of the Earth previously divided according to a grid of cells, where the meteorological observations were observed on and/or the meteorological forecasts were forecast for a date preceding the acquisition date;
a second processor configured for:
determining, for each cell in the grid of cells, based on the history of meteorological variable values, a plurality of groups of values which each comprise, at least:
a first meteorological variable value associated with a first history date;
a second meteorological variable value associated with a second history date later or earlier than the first history date, and
a history time difference between the first history date and the second history date;
calculating, for all or part of the predetermined zone of the Earth, based on the plurality of groups of values, a conditional probability function which describes the probability of observing a second meteorological variable value included in a predetermined interval on a second date subject to a condition of:
  observing a first meteorological variable value at a first date which is prior to the second date, and/or predicting on a first date a third meteorological variable value for a forecast date located around the second date, specifically, on a date which precedes, follows and/or is equal to the second date, and
  under an additional condition of observing a predetermined time difference between the first date and the second and/or forecast date,
selecting a plurality of cells from the grid, intended to be overflown by the Earth observation satellite on the acquisition date, based on the orbital characteristics of the Earth observation satellite, thereby obtaining candidate cells,
obtaining, for each candidate cell, at least one current meteorological observation associated with a planning date which precedes the acquisition date and/or at least one current meteorological forecast associated with a date located around the acquisition date,
calculating a mission plan for the Earth observation satellite based on the candidate cells and the conditional probability function, and
inserting the mission plan into the command signal.

8. The mission plan calculation device according to claim 7, wherein the plurality of groups of values further comprises of meteorological variable values which are associated with cells neighboring the current cell.

9. The mission plan calculation device according to claim 7, wherein during the calculation of the mission plan for the Earth observation satellite, the second processor is further configured for:
  selecting all or part of the candidate cells based on the conditional probability function and based on the at least one current meteorological observation and/or based on the at least one current meteorological forecast, and based on a difference between the acquisition date and a date on which the at least one a date of a current meteorological observation and/or a date of the at least one current meteorological forecast, the selected candidate cells are the candidate cells for which the conditional probability function gives, for the acquisition date, a probability greater than or less than a first predetermined probability.

10. The mission plan calculation device according to claim 9, wherein the selected candidate cells are the candidate cells for which the conditional probability function gives, for the acquisition date, a probability greater than or less than a first predetermined probability.

11. The mission plan calculation device according to claim 7, wherein the second processor calculates the conditional probability function based on the estimate of a probability density for all or part of the groups of values.

12. The mission plan calculation device according to claim 7, wherein the second processor calculates the conditional probability function based on an automatic learning model pre-trained from all or part of the groups of values.

* * * * *